May 30, 1933.  A. LA R. PARKER  1,912,299
FLEXIBLE COUPLING SYSTEM
Filed Aug. 18, 1928
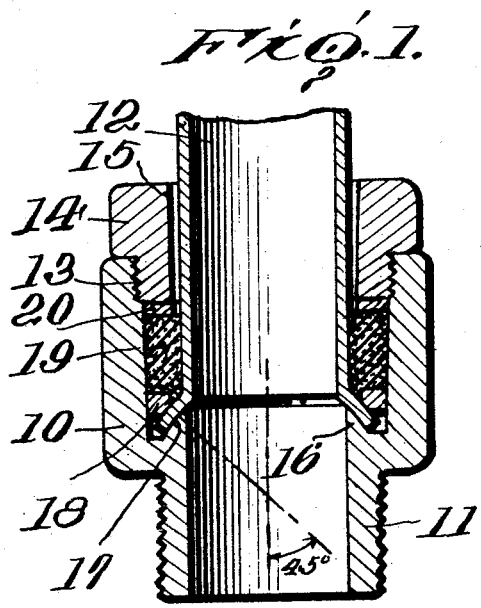
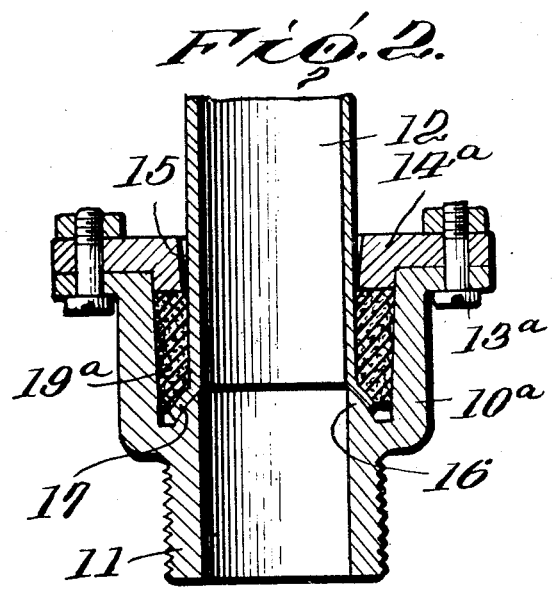
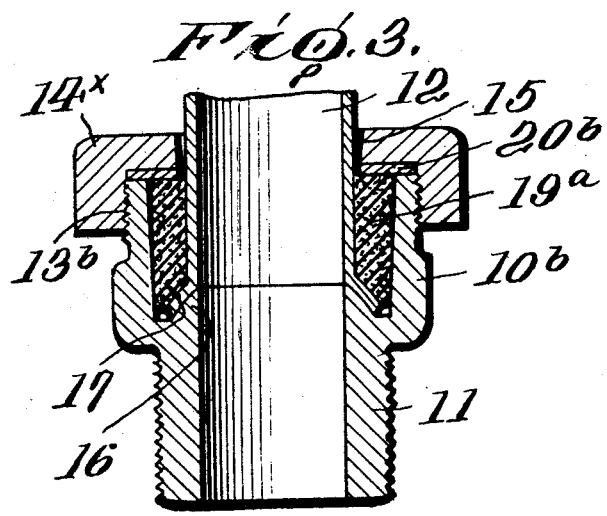
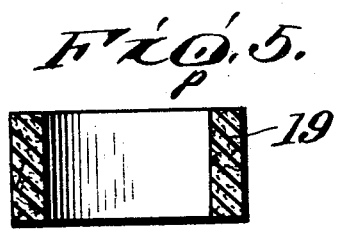
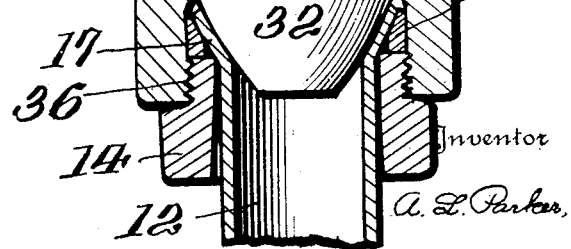
Inventor
A. L. Parker Patented May 30, 1933

1,912,299

UNITED STATES PATENT OFFICE

ARTHUR LA RUE PARKER, OF CLEVELAND, OHIO

FLEXIBLE COUPLING SYSTEM

Application filed August 18, 1928. Serial No. 300,485.

This invention relates to improvements in flexible coupling systems and more particularly bears upon a coupling in which the connections are permitted a certain movement with respect to each other, and to methods of producing such couplings.

It has been heretofore proposed to provide couplings of many types whereby to attach the end of a tube to another tube or to a solid member, involving a flaring of the end of the tube. In practical employment, however, it is found that in many instances it is desirable to permit a vibration of the tube or other angular movement of the axis of its coupled end, and in such cases it is essential that no strain should be thrown upon the tube and coupling as a result of such movements. Likewise, it is desired to provide a firm metal-to-metal seat between the tube and the relatively moving coupling member so that liquids cannot escape from the passages through the tube and such member, and on the other hand it is desirable to provide an elastic packing to supplement such metal-to-metal seal. Further, it is desirable to provide ready means and method for preparing the various parts for assemblage in the coupling.

One of the objects of the present invention, therefore, resides in providing a coupling of this type in which a metal-to-metal seal is provided between the relatively moving tube and mating coupling member.

Another object of the invention is to provide an elastic packing to supplement the metal-to-metal seal, and particularly in which the packing is employed to assist the metal-to-metal seal itself.

A further object of the invention is to provide means and methods for establishing the several parts in their desired and necessary condition for assembly in the coupling.

With these and other objects in view, as will appear in the course of the following specification and claims, the accompanying drawing is illustrative of forms of the invention, in which:

Figure 1 is an axial sectional view through one form of the coupling.

Figs. 2 and 3 are similar sections through modified forms of such coupling.

Fig. 4 is an axial section through a flaring tool which may be employed in the procedure of shaping and assembling the parts of the coupling of Fig. 1.

Fig. 5 is a detail view of an elastic compression and packing member for the coupling of Fig. 1.

In this drawing, in Fig. 1 a coupling casing member 10 is shown as provided with an assembly extension 11 which in the illustrated form is a hollow externally threaded plug to be screwed into the body of a substantially fixed member with the interior of which communication is to be established with respect to the tube member 12. The outer end of the casing 10 is provided with internal screw threads 13 to receive the packing nut or gland 14 which is provided with an aperture 15 having a conical shape to permit a rocking movement of the tube 12 whereby its axis may move angularly.

The casing 10 is provided with an inwardly extending shoulder having an axial flange 16 with a spherical or ball-shaped top having its spherical center on the axis of the extension 11 in the form shown. The end of the tube 12 is formed with a flare 17 having its internal surface of a spherical shape exactly mating with the upper spherical surface of the flange 16. Since the tube is of uniform thickness, this likewise provides a substantially spherical surface for the exterior of the tube at this flared end 17. A rigid ring 18 having an internal spherical surface to adapt it to the outer surface of the flared end 17 is mounted over this flared end and acts as a stop or support for the elastic annulus 19. A ring or washer 20 is provided over the top of this annulus and is preferably of smaller diameter than the internal bore of the casing 10 and of larger internal diameter than the tube 12. The internal bore of the casing 10 is formed conically with the larger diameter adjacent the gland nut 14 and the smaller diameter adjacent the flared end 17 of the tube.

In assembly and operation, the gland nut 14 is tightened down, revolving freely on the compression washer 20 and thus exerting a compression upon the annulus 19 which seats it firmly in the cavity of the casing 10 and upon the external surface of the tube 12, so that a seal is produced at such points, and likewise an elastic pressure upon the ring 18 so that this ring acts through the flared end 17 to seat the internal surface of this flared end upon the flange 16 of the casing 10. A metal-to-metal seal is therefore produced between the flange 16 and the flared end 17, so that any liquid such as gasoline passing through the coupling has no normal access to the elastic annulus 19. If vibration occurs, or other angular movement of the axis of the flared end 17 of the tube, movement is permitted to the tube 12 by reason of the shaping of the cavity 15 of the gland 14 and of the large internal diameter of the washer 20, and the elastic nature of the annulus 19 itself: in other words, no strain comes upon the tube 12 at the point where it enters the gland 14. The spherical shape of the surface of the flange 16 and of the flared end 17 permits these parts to slide on each other without interruption of the metal-to-metal seal, which is maintained by the elastic action of the annulus 19. It is preferred to locate the center of these spherical surfaces at such a point that the angle between the axis of the passage in the extension 11 and the cone with its apex at the center of spherical curvature and having its skirt passing through the center of the annular spherical surfaces, will be about 45° as indicated on Fig. 1 of the drawing.

In the modified form of Fig. 2, the casing 10a is provided with a seating extension 11 as before, while the tube 12 is provided with a similar flared end 17 to mate with the spherical surface of the flange 16 on the casing 10a. The annulus 19a acts directly against the substantially spherical outer surface of the flange 17 and against a packing flange 14a which likewise has a tapered cavity 15 to permit movements of the axis of the pipe 12. The packing flange 14a in this modified form is clamped down by the bolts 13a. By reason of the seating of the packing flange 14a without a rotary movement, the washer 20 is dispensed with; and in this modified form the washer 18 is eliminated. This structure is excellently adapted for the purposes above, but does not so well resist the wear occasioned by vibrational or other movements of the axis of the tube.

In the modified form according to Fig. 3, the casing 10b has the connecting extension 11, as before, and the tube 12 has a flared end 17 mating with a spherical surface on the flange 16 of the casing 10b. The annulus 19a is again located between the outer surface of the flared end 17 and a packing gland or nut 14b which has an extending flange 14x with internal screw threads to be seated on the external screw threads 13b of the casing 10b. The washer 20b is seated between the gland nut 14b and the body of the annulus 19a, so that the gland nut 14b may be rotated freely without frictional dragging upon the body of the annulus 19a. The aperture 15 of the gland nut 14b is again larger than the tube 12 to permit movements of the axis of the latter; the same is true of the washer 20b.

It will be understood that a suitable elastic material may be employed for the annuli 19, 19a. In Fig. 5 is shown the type of annulus employed in the form of Fig. 1. It is preferred, however, to form such an annulus of rubber which is so far as possible resistant to the action of the liquid passing through the coupling; for example, if the coupling is employed in a gasoline fuel line an oil-proof rubber is used which is elastic enough to be stretched in diameter to permit it to pass over the flared end 17 of the tube and the ring 18.

In Fig. 4 is shown a tool which is well adapted for employment in forming the flared end 17 on the tube 12 of Fig. 1. The body 30 of this tool has an axial aperture through it to receive the stem 31 of a die 32 having a spherical shape corresponding to the spherical surface on the flange 16. The stem 31 has a head 33 held thereto by a pin 34. The cavity 35 of the body 30 permits an axial movement of the die 32, while the outer end of the body 30 is provided with internal screw threads 36 to receive the threads on the gland nut 14.

In operation, the method of preparing the parts of the coupling for assembly is to slide the gland nut 14 over the front end of the tube 12 and place the ring 18 in position, and then screw the gland nut 14 into the body 30. Hammering upon the head 33 will cause the die 32 to produce a flaring of the end of the tube whereby the flared end 17 is made. It will be noted that the die 32 shapes this flared end 17 with the employment of the gland nut 14 and particularly the ring 18 as a matrix, with the result that the flared end 17 is shaped exactly to correspond to these parts on its external surface, and the ring 18 cooperates therewith during the latter operation of the completed joint. The gland nut 14 is now unscrewed from the body 30, and the body 30 removed from the end of the tube. The gland nut 14 is separated from the ring 18, and an elastic annulus 19 is stretched over the flared end 17 and the ring 18 and located around the tube 12 between the nut 14 and the ring 18. The casing 10 is now brought around the flared end 17, or vice versa, so that the gland nut 14 may be screwed into the casing 10. During this assemblage, the conical walls of the casing 10 guide the annulus 18 into its desired position.

The shaping and assembly of the devices according to Figs. 2 and 3 may be accomplished in a similar manner. From the above it will be apparent that a coupling for a tube has been provided wherein a flexible clamping member and the recess containing the same are so shaped that when the tube is clamped against its seat, a pressure is exerted on the tube throughout the entire region of the flexible clamping member, that is, the flared end of the tube and also a wall of the tube. Furthermore, there is a maximum pressure on the flared end of the tube and a minimum yielding pressure on the tube wall due to the fact that the recess is tapered or cone shaped and of increasing diameter from the tapered seat outwardly, while the clamping member 19 is normally of uniform diameter. The maximum pressure is endwise of the clamping member, expanding the same laterally until it contacts with the tapered wall of the recess and it will then exert a minimum pressure against the wall of the tube. By this arrangement the vibrations of the tube in the coupling are yieldingly restrained and the tube may shift on its seat and thus prevent localized bending strains in the tube resulting in a fracture of the metal tube.

It is obvious that the invention is not limited to the illustrated forms, but that it may be applied in many ways within the scope of the appended claims.

What I claim as new and desire to secure by Letters Patent is:

1. A flexible coupling for tubes comprising male and female members having a threaded connection and a recess within said members, one of said members having a projecting tapering portion extending into the recess and adapted to extend into the flared end of the tube and provide a seat therefor, the other coupling member having an opening to receive the tube, said opening having sufficient clearance to permit normal vibrations of the tube, said recess being of increasing diameter from the seat therein outwardly, a tube clamping member of flexible material located in said recess and surrounding said tube, said member being normally of substantially uniform external diameter and of sufficient length so that when the members of the coupling are connected, said coupling member with the opening therein will engage the flexible clamping member for forcing said clamping member against the flared end of the tube and the tube against said seat and will also force said flexible member against the wall of the tube and the wall of the female coupling member whereby pressure will be exerted on the tube throughout the entire region of the flexible clamping member with the maximum pressure on the flared end of the tube and a minimum yielding pressure on the tube wall so that vibrations of the tube in the coupling member are yieldingly restrained.

2. A flexible coupling for tubes comprising male and female members having a threaded connection and a recess within said members, one of said members having a projecting tapering portion extending into the recess and adapted to extend into the flared end of the tube and provide a seat therefor, the other coupling member having an opening to receive the tube, said opening having sufficient clearance to permit normal vibrations of the tube, said recess being of increasing diameter from the seat therein outwardly, a tube clamping member of flexible material located in said recess and surrounding said tube, said member being normally of substantially uniform external diameter and of sufficient length so that when the members of the coupling are connected, said coupling member with the opening therein will engage the flexible clamping member for forcing said clamping member against the flared end of the tube and the tube against said seat and will also force said flexible member against the wall of the tube and the wall of the coupling member whereby pressure will be exerted on the tube throughout the entire region of the flexible clamping member with the maximum pressure on the flared end of the tube and a minimum yielding pressure on the tube wall so that vibrations of the tube in the coupling member are yieldingly restrained, said seat on the coupling member having a spherical face conforming to and contacting with a spherical face on the flared end of the tube.

In testimony whereof, I affix my signature.

ARTHUR LA RUE PARKER.